US012745040B2

(12) United States Patent
Balthazor

(10) Patent No.: US 12,745,040 B2
(45) Date of Patent: Sep. 22, 2026

(54) REAL-TIME CONTENT-ADAPTIVE HEADPHONE AMPLIFIER WITH DYNAMIC POWER CONSUMPTION AND PSYCHOACOUSTIC CORRECTION

(71) Applicant: Victoria Balthazor, Palm Springs, CA (US)

(72) Inventor: Victoria Balthazor, Palm Springs, CA (US)

( * ) Notice: Subject to any disclaimer, the term of this patent is extended or adjusted under 35 U.S.C. 154(b) by 120 days.

(21) Appl. No.: 18/942,771

(22) Filed: Nov. 11, 2024

(65) Prior Publication Data

US 2026/0136135 A1 May 14, 2026

(51) Int. Cl.
*H04R 3/04* (2006.01)
*G10L 19/02* (2013.01)
(Continued)

(52) U.S. Cl.
CPC ................ *H04R 3/04* (2013.01); *G10L 19/02* (2013.01); *G10L 25/30* (2013.01); *H04R 2430/01* (2013.01); *H04R 2460/03* (2013.01)

(58) Field of Classification Search
None
See application file for complete search history.

(56) References Cited

U.S. PATENT DOCUMENTS

2010/0290643 A1* 11/2010 Mihelich ................. H04S 7/301 381/103
2017/0150259 A1* 5/2017 Gautama ................ H03G 7/002
(Continued)

FOREIGN PATENT DOCUMENTS

WO WO-2025240782 A1 * 11/2025 ............. G10L 25/30

OTHER PUBLICATIONS

Marty, "How Does Speaker Impedance Compare to Frequency Response?". https://soundcertified.com/how-does-speaker-impedance-compare-to-frequency-response/.13 Pages. Jul. 10, 2023 (Year: 2023).*
(Continued)

*Primary Examiner* — Qin Zhu
(74) *Attorney, Agent, or Firm* — Intellent Patents LLC; Ahmed Alhafidh

(57) ABSTRACT

This invention relates to an audio signal correction system that optimizes sound quality by dynamically adjusting for device-specific and content-specific factors. The system continuously monitors frequency-specific power consumption and impedance of audio transducers, such as headphones, to ensure efficient power usage and balanced sound across the frequency spectrum. Real-time adjustments are made through filters, including psychoacoustic corrections based on human auditory models (e.g., Fletcher-Munson curves), ensuring that sound is perceived as evenly distributed, regardless of volume or frequency. The system also employs a convolutional neural network (CNN) to analyze the incoming audio signal, generating confidence metrics based on the signal's characteristics (e.g., genre, speech). These metrics determine which content-specific filters to apply and how much of each, tailoring the audio output to the specific content. The result is an adaptive system that delivers a highly optimized and personalized listening experience.

18 Claims, 7 Drawing Sheets

(51) Int. Cl.

| | |
|---|---|
| ***G10L 21/0232*** | (2013.01) |
| ***G10L 21/034*** | (2013.01) |
| ***G10L 25/30*** | (2013.01) |
| ***H04R 5/04*** | (2006.01) |
| ***H04R 29/00*** | (2006.01) |
| ***H04S 7/00*** | (2006.01) |

(56) References Cited

U.S. PATENT DOCUMENTS

2018/0212579 A1* 7/2018 Hwang .................... H04R 3/00
2019/0050716 A1* 2/2019 Barkan ................. G06F 16/686
2021/0217430 A1* 7/2021 Yao ........................ H03G 5/005
2026/0075377 A1* 3/2026 Horiba ..................... H04R 3/00

OTHER PUBLICATIONS

Texas Instruments, "Power in AC Circuits". https://web.archive.org/web/20161001175129/https://www.electronics-tutorials.ws/accircuits/power-in-ac-circuits.html. 16 Pages. Oct. 1, 2016 (Year: 2016).*

* cited by examiner

REAL-TIME CONTENT-ADAPTIVE HEADPHONE AMPLIFIER WITH DYNAMIC POWER CONSUMPTION AND PSYCHOACOUSTIC CORRECTION

FIELD OF TECHNOLOGY

This disclosure relates generally to digital signal processing systems and, more particularly, to a method, a device and/or a system of audio signal correction.

BACKGROUND

A listening experience through headphones is dependent on a number of factors, including, but not limited to the impedance of the headphones, psychoacoustics, and content-specific equalization parameters.

Feedback methods which account for device-specific playback performance usually gauge the volume output of the audio device in order to calibrate the amplification of the incoming audio signal. However, feedback methods that operate on audio device output require a carefully placed microphone that is meant to account for the characteristics of the room and not just the idiosyncrasies of the audio output device itself. In addition to the potential for user error to prevent optimal characterization of the audio output quality, these feedback methods are cumbersome and cannot account for stochastic environmental variables (noise, obstructions, sound absorption/reflection) that inadvertently affect the feedback. Furthermore, this corrective filter is usually generated once—at the time of initial calibration—and does not adapt to signals that have widely different frequency content, such as music of different genres, a movie soundtrack, or a podcast. These feedback methods chiefly do not operate based on the real-time power consumption of the device—which is directly related to the volume output of the various frequencies played.

Current methods also do not make psychoacoustic corrections that account for a user's individual listening experience, i.e., the user's psychological perception of sound at different frequencies. ISO 226 is an international standard developed to equalize sound pressure levels across the frequency spectrum from the perspective of the human ear, which is highly sensitive to mid frequencies, but less sensitive to low and high frequencies. Some amplifiers which feature a "loudness" button which boosts low and high frequencies, but this change does not factor the volume level of the sound played—this causes the loudness button to have varying effectiveness at different volumes.

Lastly, equalization of a frequency response can be achieved by applying preset filters which correspond to specific genres of music. However, equalization almost always involves applying a single filter which may not account for variation within a single track. Furthermore, these equalization filters are usually user-selected and do not adapt to these variations. U.S. Pat. No. 11,315,589 (hereinafter '589) describes a spectral analysis system which provides quantifiable means of differentiating qualitative features of music. However, this system fails to account for varying power consumption of different types of audio output devices, which can cause equalization presets to be applied ineffectively or produce an unsatisfactory listening experience. Furthermore, it may not be the case that applying one or another filter will correctly equalize a soundtrack or that a single soundtrack will be adequately equalized by the application of a single filter regardless of its adaptive nature.

Thus, there exists a need to assess audio output device power efficiency and adjust an incoming audio signal to correct for device-specific power usage, a user's psychoacoustic listening experience, and content-specific equalization issues.

SUMMARY

Described are systems, devices, and methods of audio signal correction. In one aspect, a system comprises one or more processors, one or more memory devices, one or more sensors communicatively coupled to the one or more processors, an audio amplifier communicatively coupled to the one or more processors, and an audio transducer communicatively coupled to the audio amplifier. The one or more memory devices comprise a series of instructions executable by the one or more processors, wherein executing the series of instructions causes the one or more processors to receive an incoming audio signal and amplify the incoming audio signal through the audio amplifier. Furthermore, the one or more memory devices comprise instructions to output the amplified audio signal through the audio transducer, wherein the amplified audio signal comprises one or more frequencies output. The one or more memory devices also comprise instructions to measure, through one or more sensor(s), a frequency-specific AC power consumption of the audio transducer for each of the one or more frequencies output by the audio transducer. Measuring the frequency-specific AC power consumption may involve measuring an amplitude of a voltage of the incoming audio signal, an amplitude of a current of the incoming audio signal, and a phase shift between the voltage and the current. The one or more memory devices also comprise instructions to calculate an impedance of the audio transducer and a projected volume level of the audio transducer based on the frequency-specific AC power consumption.

The system may also embody instructions to apply an inverse discrete Fourier transform to the frequency-specific AC power consumption to generate a finite impulse response filter appliable to the incoming audio signal to output a corrected amplified audio signal, wherein the finite impulse response filter equalizes the projected volume level output by the audio transducer.

Additionally, the system may also embody instructions to: determine a corresponding equal-loudness curve based on the frequency-specific AC power consumption, the impedance of the audio transducer and the projected volume level of the audio transducer; and invert the corresponding equal-loudness curve to produce a psychoacoustic corrective filter appliable to the incoming audio signal to output a corrected amplified audio signal, wherein the psychoacoustic corrective filter equalizes a user-perceived loudness of the incoming audio signal across the one or more frequencies output by the audio transducer.

Lastly, the system may also comprise instructions to: generate a spectrogram corresponding to the incoming audio signal, and, based on one or more pre-trained weights of a convolutional neural network and the spectrogram, determine a plurality of confidence values corresponding to a set of defined qualitative characteristics associated with the incoming audio signal. Additionally, the system also determines, based on the confidence values corresponding to the set of defined qualitative characteristics, a degree of how much one or more preset filters corresponding to the set of defined qualitative characteristics are appliable to the incoming audio signal.

In another aspect, a device comprises one or more processors, one or more memory devices, one or more sensors communicatively coupled to the one or more processors, and an audio amplifier communicatively coupled to the one or more processors and configured to output to an audio transducer. The one or more memory devices comprise a series of instructions executable by the one or more processors, wherein executing the series of instructions causes the one or more processors to receive an incoming audio signal and amplify the incoming audio signal through the audio amplifier. Furthermore, the one or more memory devices comprise instructions to output the amplified audio signal through the audio transducer, wherein the amplified audio signal comprises one or more frequencies output. The one or more memory devices also comprise instructions to measure, through one or more sensor(s), a frequency-specific AC power consumption of the audio transducer for each of the one or more frequencies output by the audio transducer. Measuring the frequency-specific AC power consumption may involve measuring an amplitude of a voltage of the incoming audio signal, an amplitude of a current of the incoming audio signal, and a phase shift between the voltage and the current. The one or more memory devices also comprise instructions to calculate an impedance of the audio transducer and a projected volume level of the audio transducer based on the frequency-specific AC power consumption.

The device may also embody instructions to apply an inverse discrete Fourier transform to the frequency-specific AC power consumption to generate a finite impulse response filter appliable to the incoming audio signal to output a corrected amplified audio signal, wherein the finite impulse response filter equalizes the projected volume level of the one or more frequencies output by the audio transducer.

Additionally, the device may also embody instructions to: determine a corresponding equal-loudness curve based on the frequency-specific AC power consumption, the impedance of the audio transducer and the projected volume level of the audio transducer; and invert the corresponding equal-loudness curve to produce a psychoacoustic corrective filter appliable to the incoming audio signal to output a corrected amplified audio signal, wherein the psychoacoustic corrective filter equalizes a user-perceived loudness of the amplified signal output by the audio transducer.

Lastly, the device may also comprise instructions to: generate a spectrogram corresponding to the incoming audio signal, and, based on one or more pre-trained weights of a convolutional neural network and the spectrogram, determine a plurality of confidence values corresponding to a set of defined qualitative characteristics associated with the incoming audio signal. Additionally, the device may also determine, based on the confidence values corresponding to the set of defined qualitative characteristics, a degree of how much one or more preset filters corresponding to the set of defined qualitative characteristics are appliable to the incoming audio signal.

In yet another aspect, a method of audio signal correction embodied in machine-readable instructions stored in one or more memory devices involves receiving, through one or more processors, an incoming audio signal and amplify the incoming audio signal through an audio amplifier communicatively coupled to the one or more processors; outputting the amplified audio signal through an audio transducer coupled to the audio amplifier, wherein the amplified audio signal comprises one or more frequencies output; measuring, through one or more sensor(s) communicatively coupled to the one or more processor(s), a frequency-specific AC power consumption of the audio transducer for each of the one or more frequencies output by the audio transducer; and calculating an impedance of the audio transducer and a projected volume level of the audio transducer based on the frequency-specific AC power consumption.

The method may involve applying an inverse discrete Fourier transform to the frequency-specific AC power consumption to generate a finite impulse response filter appliable to the incoming audio signal to output a corrected amplified audio signal, wherein the finite impulse response filter equalizes the projected volume level of the one or more frequencies output by the audio transducer.

Additionally, the method may also involve determining a corresponding equal-loudness curve based on the frequency-specific AC power consumption, the impedance of the audio transducer and the projected volume level of the audio transducer; and inverting the corresponding equal-loudness curve to produce a psychoacoustic corrective filter appliable to the incoming audio signal to output a corrected amplified audio signal, wherein the psychoacoustic corrective filter equalizes a user-perceived loudness of the incoming audio signal across the one or more frequencies output by the audio transducer.

Lastly, the method may also involve generating a spectrogram corresponding to the incoming audio signal. Based on one or more pre-trained weights of a convolutional neural network and the spectrogram, the method may involve determining a plurality of confidence values corresponding to a set of defined qualitative characteristics associated with the incoming audio signal. The method also may involve determining, based on the confidence values corresponding to the set of defined qualitative characteristics, a degree of how much one or more preset filters corresponding to the set of defined qualitative characteristics are appliable to the incoming audio signal.

BRIEF DESCRIPTION OF THE DRAWINGS

The embodiments of this invention are illustrated by way of example and not limitation in the figures of the accompanying drawings, in which like references indicate similar elements and in which.

Figure 1:
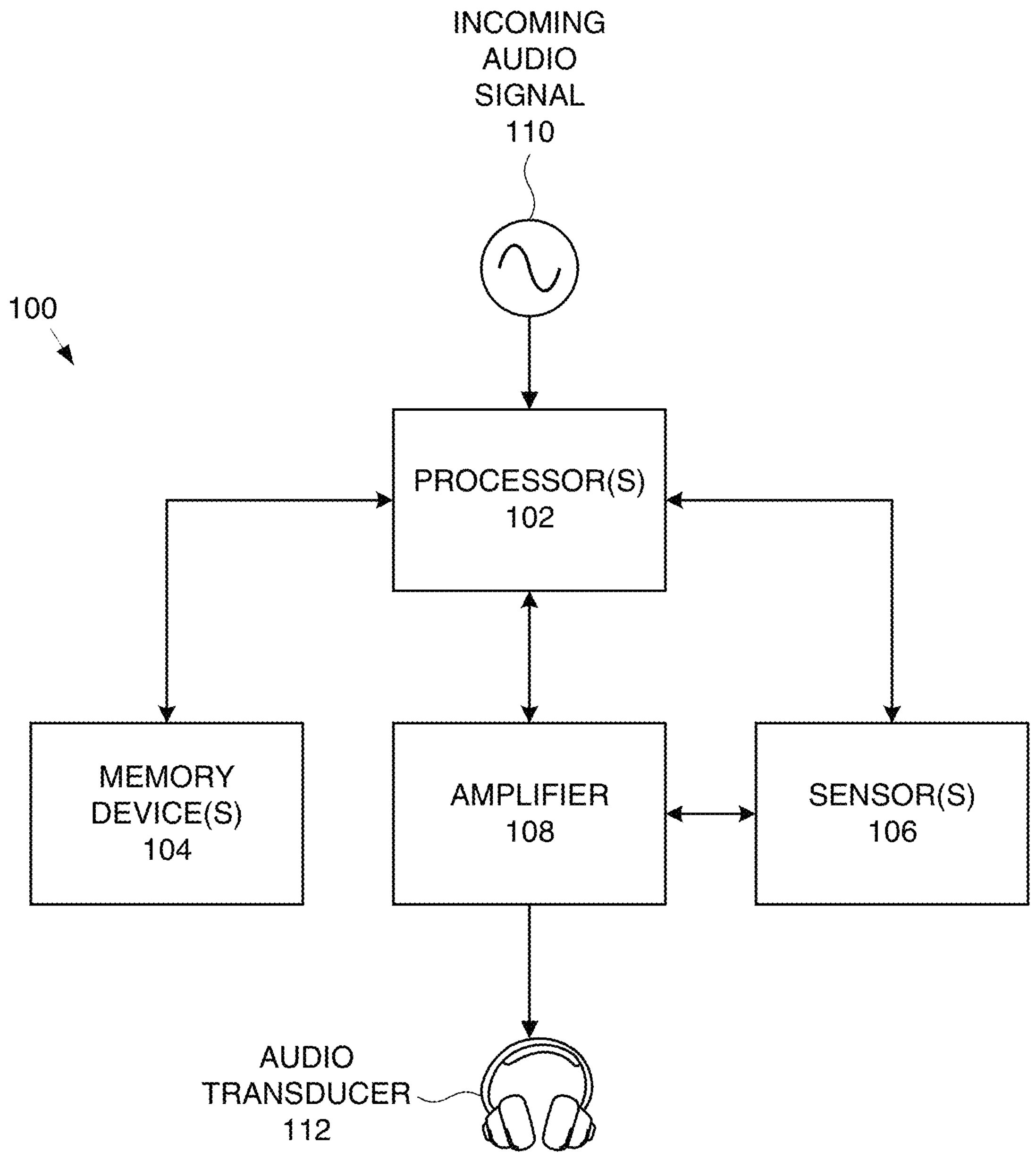
FIG. 1 is a block diagram of an audio signal correction system, according to one or more embodiments.

Other features of the present embodiments will be apparent from the accompanying drawings and from the detailed description that follows.

DETAILED DESCRIPTION

The invention addresses the complexity of optimizing a desirable listening experience, traditionally considered subjective, by objectively improving sound quality through power consumption correction, psychoacoustic loudness correction, and content-adaptive equalization. This optimization is relative to the sensitivities of the human ear, which varies across frequency ranges and between different individuals. Achieving this requires the continuous monitoring of device-specific parameters, such as the power consumed by the transducer and its impedance, which fluctuate with audio frequency.

Existing methods for calibrating audio transducers typically use cumbersome feedback techniques, such as a microphone to capture and measure test tones across different frequencies. However, this approach is limited in its scope because it treats sound as a static signal. Real-world audio, especially music, is dynamic and textured, composed of a wide range of frequencies that vary in intensity over time. Correcting for these fluctuations using a fixed digital filter fails to account for the specific power consumption inefficiencies of the audio transducer, the psychological nuances of human auditory perception, or the prevalent diversity of musical genres.

This invention addresses these limitations by introducing an audio signal correction system that dynamically measures the power consumption and impedance of an audio transducer (such as headphones) in real-time and filters the audio signal in real-time. The system continuously monitors frequency-specific power consumption, calculates impedance, and filters the signal to equalize perceived loudness across the frequency spectrum. It also incorporates psychoacoustic corrections based on human auditory sensitivity models (such as Fletcher-Munson curves) to ensure that the sound is perceived as balanced, regardless of volume level or content type. In addition, the invention utilizes a convolutional neural network (CNN) trained to analyze the incoming audio signal and identify key characteristics that allow the system to apply content-specific filters. This enables the system to adapt not only to the technical aspects of the audio devices but also to the nature of the content, providing a highly optimized and adaptive content aware listening experience.

Although this audio signal correction system may be applied to any type of audio transducer, headphones are a preferred environment suited for real-time, device-specific signal correction. Headphones create a more controlled and isolated acoustic environment compared to regular speakers. Since headphones are worn directly on or in the ear, there is minimal interference from external environmental factors such as room acoustics, reflection, or absorption. This may simplify measurements and adjustments to the signal by diminishing the effects of unpredictable acoustic variables like room size, furniture, or surface materials that significantly affect acoustic experience. By focusing on headphones, the invention can more accurately address the power consumption and impedance variations without needing to consider external noise or room characteristics that would otherwise complicate the real-time measurement process.

Furthermore, headphones typically have a wider range of impedance ratings (e.g., from 8 ohms to over 600 ohms) compared to loudspeakers. This means that the relationship between the power delivered by the amplifier and the sound output (measured in sound pressure level or SPL) is more sensitive and varies greatly depending on the specific model and type of headphones. The invention's ability to measure frequency-specific AC power consumption and impedance in real time is especially beneficial for headphones, where these factors can vary significantly, impacting both sound quality and power efficiency.

The intimate proximity of headphones to the human ear introduces unique psychoacoustic challenges. Headphones, due to their direct delivery of sound to the ear canal, more strongly reveal how sensitive the human ear is to different frequencies at varying volumes, particularly at low and high volumes. The system's psychoacoustic correction is especially critical for headphones, as the close proximity to the ear accentuates the differences in sensitivity across frequency bands. Without psychoacoustic correction, even minor imbalances in loudness can lead to a distorted or undesirable listening experience. The invention's integration of psychoacoustic correction, such as through the use of Fletcher-Munson equal-loudness curves, is highly relevant for headphones because the listener is more likely to perceive imbalances in loudness or discomfort at certain frequencies and a given acoustic sound pressure level. Furthermore, impedance variation in headphones makes real-time measurement crucial—for example, impedance spikes in certain frequency ranges could significantly impact power distribution and thus audio clarity, necessitating constant monitoring and adjustment. However, it will be appreciated that any audio transducer may be utilized by the audio signal correction system to produce a more desirable listening experience—and the use of an external microphone would only improve the effects of the audio signal correction system by accounting for environmental variables. Further yet, it will be appreciated that the internal power consumption analysis and filtering system of the audio signal correction system may be more impactful than accounting for external influences on the listening experience.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Referring to FIG. 1, an audio signal correction system 100 is shown. The audio signal correction system 100 comprises one or more processor(s) 102, one or more memory device(s) 104 communicatively coupled to the one or more processor(s) 102, one or more sensor(s) 106 communicatively coupled to the one or more processor(s) 102, an amplifier 108 communicatively coupled to the one or more processor(s) 102 and the one or more sensor(s) 106. The processor(s) 102 receive an incoming audio signal 110, optionally apply filters, and output it to the amplifier 108, which amplifies the signal and outputs the amplified audio signal to an audio transducer 112, such as headphones.

The one or more processor(s) 102 may include one or more central processing units (CPUs), graphics processing units (GPUs), and/or neural processing units (NPUs). For example, the audio signal correction system 100 may employ a general-purpose CPU used for most computing tasks but a dedicated CPU to, for example, sample the alternating voltage and current supplied by the amplifier 108 to the audio transducer 112 to determine amplitudes and phase shifts of the waveforms thereof. In another example, one or more GPUs may be utilized to handle parallel processing tasks, such as detecting the signal frequencies of the incoming signal (fast Fourier transform (FFT)), applying a frequency-specific filter (e.g. finite impulse response (FIR) filters), and applying a loudness correction filter based on equal-loudness curves. One or more NPUs may be used to accelerate machine learning tasks (e.g. convolution) including content recognition (spectral analysis), content-dependent adaptive filtering, and psychoacoustic modeling.

The memory device(s) 104 may include volatile (e.g., random access memory, caches) and/or non-volatile memory (e.g., solid state drives, hard disk drives) communicatively coupled to the processor(s) 102 and serve as a repository for instructions executed and resources (e.g., pre-trained weight data, manipulable preset filters) relied upon by the processor(s) 102. The memory device(s) 104 store: algorithms for signal processing tasks, such as applying equalization filters and psychoacoustic corrections; instructions for calculating the impedance and power consumption of the audio transducer 112; machine learning models, such as those used by a neural processing unit (NPU) for content recognition and adaptive filtering; and data related to psychoacoustic models, like equal-loudness curves, which are applied in real-time to adjust for user-perceived loudness across different frequencies.

The sensor(s) 106 monitor various electrical parameters of the amplifier 108, the incoming audio signal 110, and the audio transducer 112. These sensor(s) 106 measure: AC voltage supplied by the amplifier 108 to the audio transducer 112; alternating current 116 drawn by the audio transducer 112, which is used in part to determine the power consumption of the audio transducer 112; and the phase shift between the AC voltage and current, a key factor in calculating the impedance of the audio transducer 112.

The amplifier 108 may comprise a speaker amplifier responsible for boosting the incoming audio signal 110 to a level suitable for driving the audio transducer 112 (e.g., headphones). The amplified signal may be adjustable based on real-time feedback from the sensor(s) 106 and filters configured by the processor(s) 102. The incoming audio signal 110 is the audio input that is processed, amplified, and output by the system. This signal may represent music, speech, or any other type of audio. Upon receiving the incoming audio signal 110, the system may process it by applying various filters (e.g., equalization, psychoacoustic correction), amplify it through the amplifier 108, and output audio through the audio transducer 112. The audio transducer 112 may be any device (e.g. headphones) that converts the amplified electrical signal into sound. It is directly driven by the amplifier(s) 108 and its impedance and power consumption vary depending on the frequency and volume of the signal, variations of which are continuously monitored by the sensor(s) 106.

Figure 2:
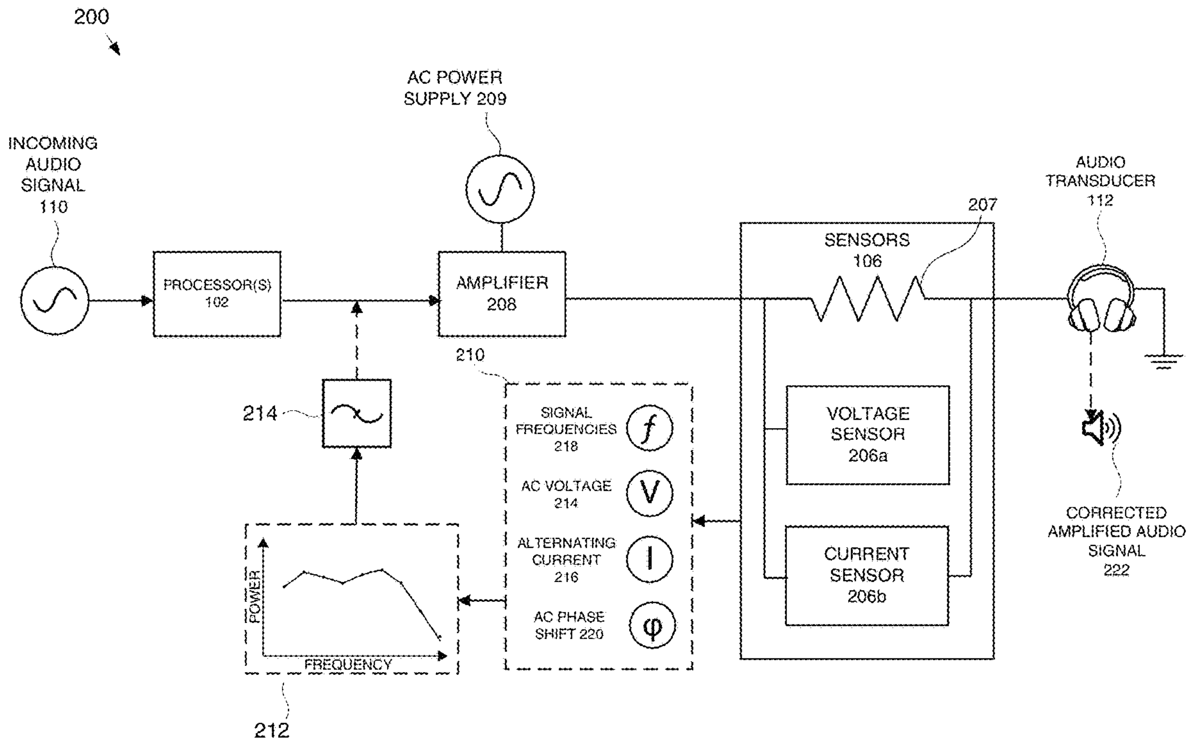
FIG. 2 is a block diagram showing a detailed flow of device-specific audio signal correction, according to one or more embodiments.

FIG. 2 is a block diagram of an audio signal correction system 200 showing a detailed flow of how the system measures AC power consumption parameters 210 of the incoming audio signal 110 and generates device-specific corrective filters 214, according to one or more embodiments. Ohm's Law forms the basis for calculating the relationship between voltage, current, and impedance in the system. For an audio signal transducer 112 (such as headphones), $$V = I \cdot Z \quad (1)$$

where V is the AC voltage 214 measured by a voltage sensor 206*a*, l is the alternating current 216 measured by a current sensor 206*b* (e.g. using a difference amplifier) in series with a low-Ohm resistor 207, and Z is the impedance (shown in FIG. 3) calculated based on the AC voltage 214 and alternating current 216. In the audio signal correction system 200, Z is frequency-dependent. In AC circuits, Z is more complex than in DC circuits because it includes both resistive and reactive components (inductive or capacitive). For the audio transducer 112, Z may vary with frequency, which is calculated as:

$$Z(f) = \frac{V(f)}{I(f)} \quad (2)$$

where V(f) is the voltage at frequency f and I(f) is the current at frequency f. To determine the signal frequencies 218 played in the incoming audio signal 110, the audio signal correction system 200 applies a discrete Fourier transform to the incoming audio signal 110, converting it from the time domain to the frequency domain, enabling the system to analyze the signal frequencies 218 of the incoming audio signal 110 as shown:

$$X(k) = \sum_{n=0}^{N-1} x(n) \cdot e^{\frac{-j2\pi kn}{N}} \quad (3)$$

where X(k) represents the frequency-domain component at the k-th frequency of the incoming audio signal 110, x(n) is the n-th sample in the time-domain sequence of the signal, N is the total number of samples, and k is the index of each frequency component (from 0 to N−1).

The audio signal correction system 200 measures the real power consumption to determine how much is being used by the audio transducer 112. AC power is characterized by real power (P) measured in watts (W), reactive power (Q) measured in volt-amperes reactive (VARs) and apparent power(S) measured in volt-amperes (VA) as shown below.

$$P = V_{rms} \cdot I_{rms} \cdot \cos\phi \quad (4)$$

$$Q = V_{rms} \cdot I_{rms} \cdot \sin(\phi) \quad (5)$$

$$S = V_{rms} \cdot I_{rms} \quad (6)$$

In the audio signal correction system 200, the voltage sensor 206*a* and the current sensor 206*b* measure the AC voltage 214 and alternating current 216 at each frequency, and the phase shift (¢) 220 between them is used to calculate the real power (P) and apparent power(S), which allow the system to calculate how efficiently power is being used by the audio transducer 112. Power factor (PF) is measured to determine how effectively the electrical power is being converted to real power (P) as shown:

$$PF = \cos(\phi) \quad (7)$$

where ϕ is the phase angle between the voltage and the current. A power factor lower than 1 indicated inefficiency, which the audio signal correction system 200 aims to correct in real-time.

To correct the output of the audio transducer 112 relative to the real AC power consumption parameters 210 in real-time, the system generates a frequency-specific power consumption representation 212. This may be generated by dynamically sampling simultaneously the AC voltage 214 and alternating current 216 of the incoming audio signal 110 to obtain accurate amplitudes of the AC voltage 214, alternating current 216 and the phase shift 220 therebetween.

This frequency-specific power consumption data provides insight into how different frequencies are being handled by the audio transducer. For instance, if the audio transducer 112 consumes more power at low frequencies (e.g., bass-heavy signals), the system may detect inefficiencies or imbalances in how the signal is being played back. To correct power inefficiencies, the system utilizes the frequency-specific power consumption representation 212 to produce a power consumption correction FIR filter 214. For frequencies where the audio transducer 112 consumes more power, the power consumption correction FIR filter 214 will attenuate power consumption at those frequencies once applied to the incoming audio signal 110. In one embodiment, the system may produce the power consumption correction FIR filter 214 by inverting the results around an average calculated across the frequency-specific power consumption representation 212 and applying an inverse discrete Fourier transform to the inverted results to calculate one or more frequency coefficients of the power consumption correction FIR filter 214. Applied to the amplifier 208, the power consumption correction FIR filter 214 causes the audio transducer 112 to output a corrected amplified audio signal 222 which is characterized by a balanced signal output with flat loudness across the signal frequencies 218.

Figure 3:
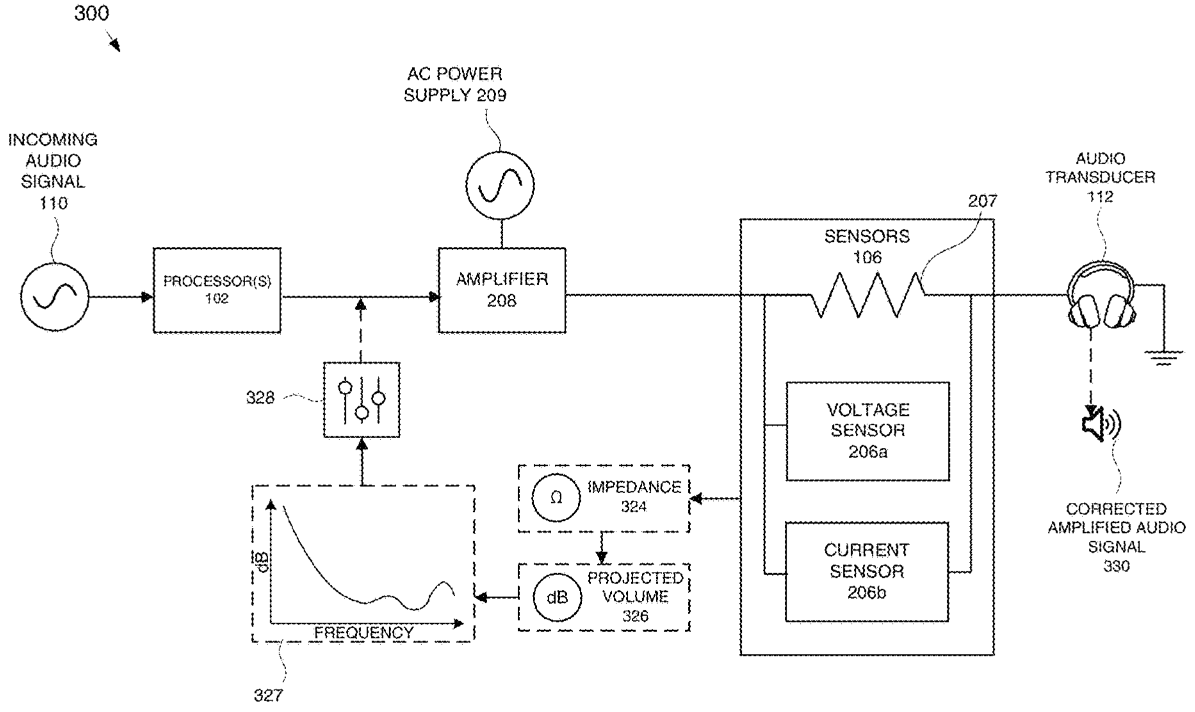
FIG. 3 is a block diagram showing a detailed flow of psychoacoustic audio signal correction, according to one or more embodiments.

However, additional correction is needed to account for the sensitivities of the human auditory system. Referring additionally to FIG. 3, a block diagram of an audio signal correction system 300 shows a detailed flow of psychoacoustic audio signal correction, according to one or more embodiments. In one embodiment, once loudness is equalized by application of the power consumption correction FIR filter 214, the AC power consumption parameters 210 the incoming audio signal 110 may be used to calculate the impedance 324 of the audio transducer 112 and, subsequently, a projected volume 326 of the audio transducer 112. The resulting projected volume 326 may be plotted against the signal frequencies 218 to approximate a corresponding equal-loudness curve 327 which may be converted to a psychoacoustic correction FIR filter 328 which may be used to equalize the perceived loudness across the signal frequencies 218. The system may apply an inverse discrete Fourier transform to the corresponding equal-loudness curve 327 to produce the psychoacoustic correction FIR filter 328, which when applied to the incoming audio signal 110 produces a corrected amplified signal 330 when output through the audio transducer 112. While device-specific corrections ensure consistent audio quality based on impedance and power consumption of the attached audio transducer 112 and psychoacoustic corrections equalize loudness based on the sensitivities of the human ear to specific frequency ranges, content-specific filtering is still required to modulate the audio output with respect to the characteristics of the incoming signal. This ensures that a piece of music, a speech, or ambient noise receives optimal signal processing based on its unique frequency distribution.

Figure 4:
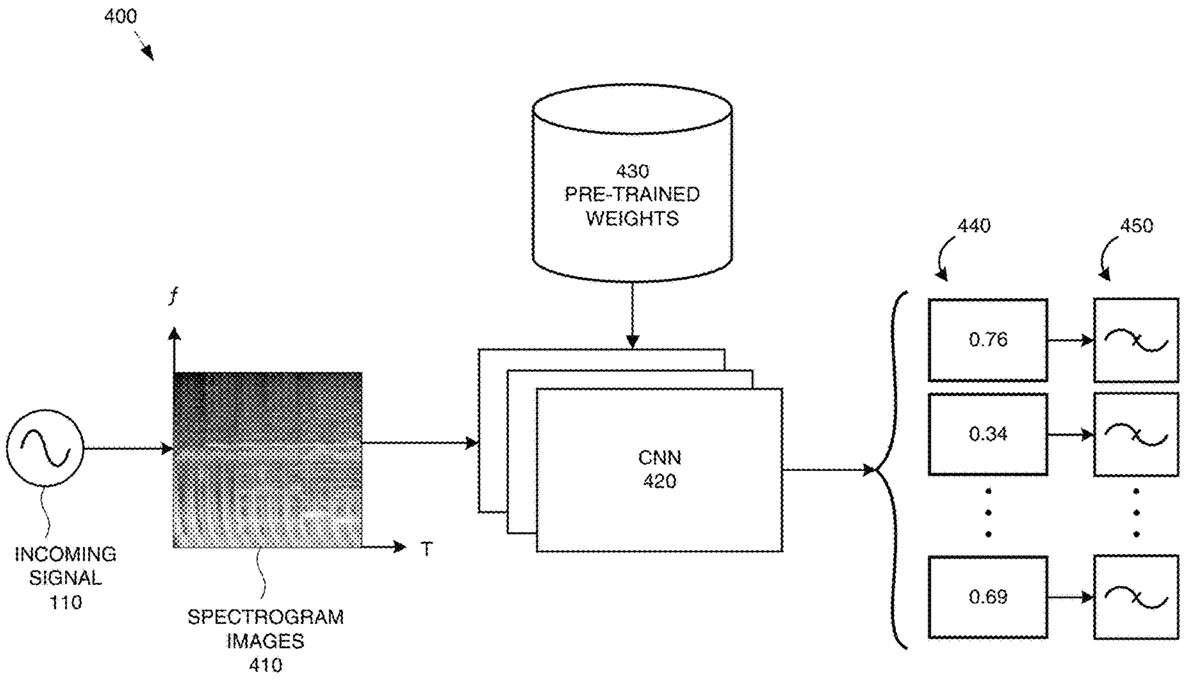
FIG. 4 is a block diagram showing a detailed flow of content-aware equalization, according to one or more embodiments.

FIG. 4 is a block diagram of the audio signal correction system 400 showing a detailed flow of a content-aware equalization method, according to one or more embodiments. The audio signal correction system 400 employs a convolutional neural network (CNN) to automatically determine the appropriate filters and presets to apply to the incoming audio signal 110 based on its characteristics (e.g., genre, total quality, mood, tempo, key, progression(s)). The goal of this content analysis and feedback is to analyze the audio content in real-time and apply tailored signal processing that enhance the audio according to its type (e.g., speech, different genres of music, or other). It should be appreciated that the boundaries between genres and many sub-genres may often be blurred, subjective lines; however, categorical relationships between music exist because of shared musical characteristics.

In one embodiment, the audio signal correction system 400 first generates spectrogram images 410 for specific durations of time using signal processing techniques such as the short-time Fourier transform (STFT), which divides the signal into time windows and computes the frequency spectrum for each window, creating an image where the intensity of colors of brightness represents the amplitude of each frequency at any given moment. In a further embodiment, the audio signal correction system 400 may utilize a modified STFT incorporating Mel frequency binning, involving non-linearly transforming the frequency scale into the Mel Scale, which separates frequencies based on equal distances that humans are able to differentiate.

These spectrogram images 410 are input into a series of layers in a CNN 420 model to analyze the qualitative characteristics of the audio signal. The CNN 420 employs a set of pre-trained weights 430 which have been optimized for specific qualitative features. These weights are parameters of the neural network that are learned during a training process on a large dataset of spectrogram images corresponding to different types of audio content (e.g., music genres, speech patterns, environmental sounds). The network processes the spectrogram images 410 by passing them through multiple convolutional layers followed by a number of pooling layers, extracting increasingly complex features from the images, such as specific frequency patterns that may correspond to bass-heavy music, vocals, or ambient noise.

The CNN 420 outputs a set of confidence values 440, each representing the likelihood that the incoming audio signal 110 contains certain defined qualitative characteristics. These qualitative characteristics could include factors such as: music genres (e.g., classical, rock, jazz), speech content (e.g., dialogue, podcasts, stand-up comedy), or environmental sounds or noise (e.g. cityscape, natural soundscapes). Each of the confidence values 440 represents a probability (ranging from 0 to 1) that the incoming signal 110 fits a particular category which corresponds to a preset filter 450. For example, if the CNN detects that the incoming signal 110 has features resembling speech (mid frequencies), the confidence value for speech might be 0.75, indicating a high probability that the audio contains dialogue or spoken content. Similarly, if the audio resembles a music track with strong bass components, the system may output a high confidence value for music genres that emphasize lower frequencies (e.g., 0.69 for electronic music). A detailed discussion of an exemplary CNN is described in '589.

Based on the confidence values 440 generated by the CNN 420, the system determines which of the preset filters 450 are most appropriate for the incoming audio signal. This decision is informed by the highest confidence values across the set of defined characteristics. Each preset filter 450 is designed to optimize the audio signal for specific types of content. For example, a preset filter 450 for speech may enhance vocal clarity and reduce background noise. A preset filter 450 for bass-heavy music may boost lower frequencies and apply dynamic range compression to manage volume levels. The audio signal correction system 400 dynamically selects and applies one or more of the preset filters 450. However, the audio signal correction system 400 not only determines which preset filters 450 to apply but calculates the degree of how much of each preset filter 450 should be applied, which may be proportional to the corresponding confidence value 440. A threshold confidence value may be determined, thereby suggesting that confidence values underneath which correspond to filters which may be considered irrelevant.

Figure 5:
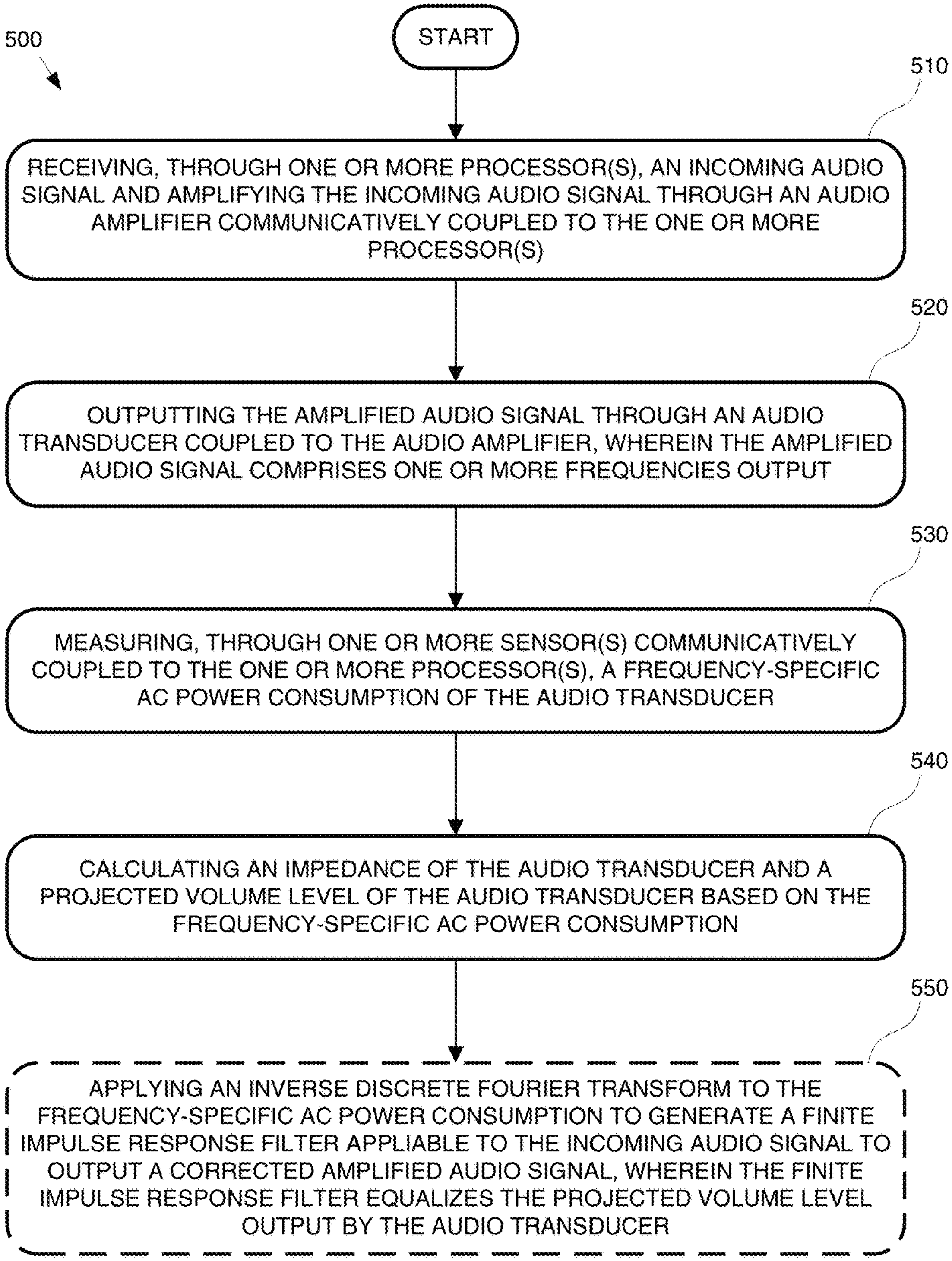
FIG. 5 is a flowchart showing a power consumption correction method of determining power consumption parameters of an audio transducer and applying a corrective filter, according to one or more embodiments.

Referring to FIG. 5, a power consumption correction method 500 of determining power consumption parameters of an audio transducer and applying a corrective filter is shown. In a step 510, an audio signal correction system receives, through one or more processor(s), an incoming audio signal and amplifies the incoming audio signal through an audio amplifier communicatively coupled to the one or more processor(s). The audio amplifier may be configured to apply custom filters to the incoming audio signal based on instructions by the processor. In a step 520, the audio signal correction system outputs the amplified audio signal through an audio transducer (e.g., headphones) coupled to the audio amplifier. The amplified audio signal comprises one or more frequencies output. In a step 530, the audio signal correction system measures, through one or more sensor(s) (i.e., through a voltage sensor, a current sensor) communicatively coupled to the one or more processor(s), a frequency-specific AC power consumption of the audio transducer (determined by sampling the voltage and current to determine amplitudes thereof and using amplitudes in conjunction with phase shift to determine real AC power consumption). In a step 540, the audio signal correction system calculates an impedance of the audio transducer and a projected volume level of the audio transducer based on the frequency-specific AC power consumption.

In a step 550, the audio signal correction system applies an inverse discrete Fourier transform to the frequency-specific AC power consumption to generate a finite impulse response filter appliable to the incoming audio signal to output a corrected amplified audio signal. The finite impulse response filter equalizes the projected volume level output by the audio transducer.

Figure 6:
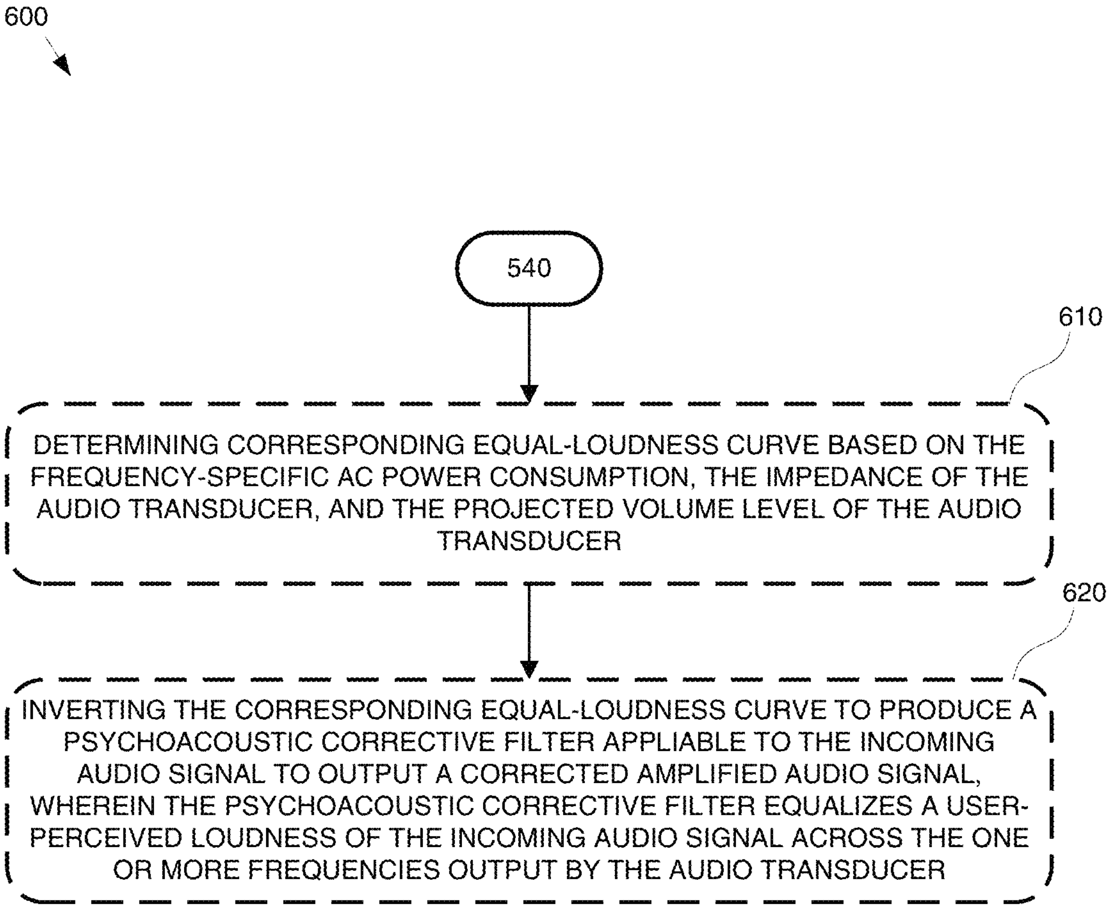
FIG. 6 is a flow chart showing a psychoacoustic correction method of generating and applying a psychoacoustic corrective filter, according to one or more embodiments.

Referring to FIG. 6, a psychoacoustic correction method 600 of generating and applying a psychoacoustic corrective filter is shown. In a step 610, the audio signal correction system determines a corresponding equal-loudness curve based on the frequency-specific AC power consumption, the impedance of the audio transducer, and the projected volume level of the audio transducer. In a step 620, the audio signal correction system inverts the corresponding equal-loudness curve to produce a psychoacoustic corrective filter appliable to the incoming audio signal to output a corrected amplified audio signal. The psychoacoustic corrective filter equalizes a user-perceived loudness of the incoming audio signal across the one or more frequencies output by the audio transducer. Fletcher-Munson curves are widely used to correct for perceived loudness, but other corrective standards may be used, such as Robinson-Dadson curves or the more recently adjusted ISO 226:2023.

Figure 7:
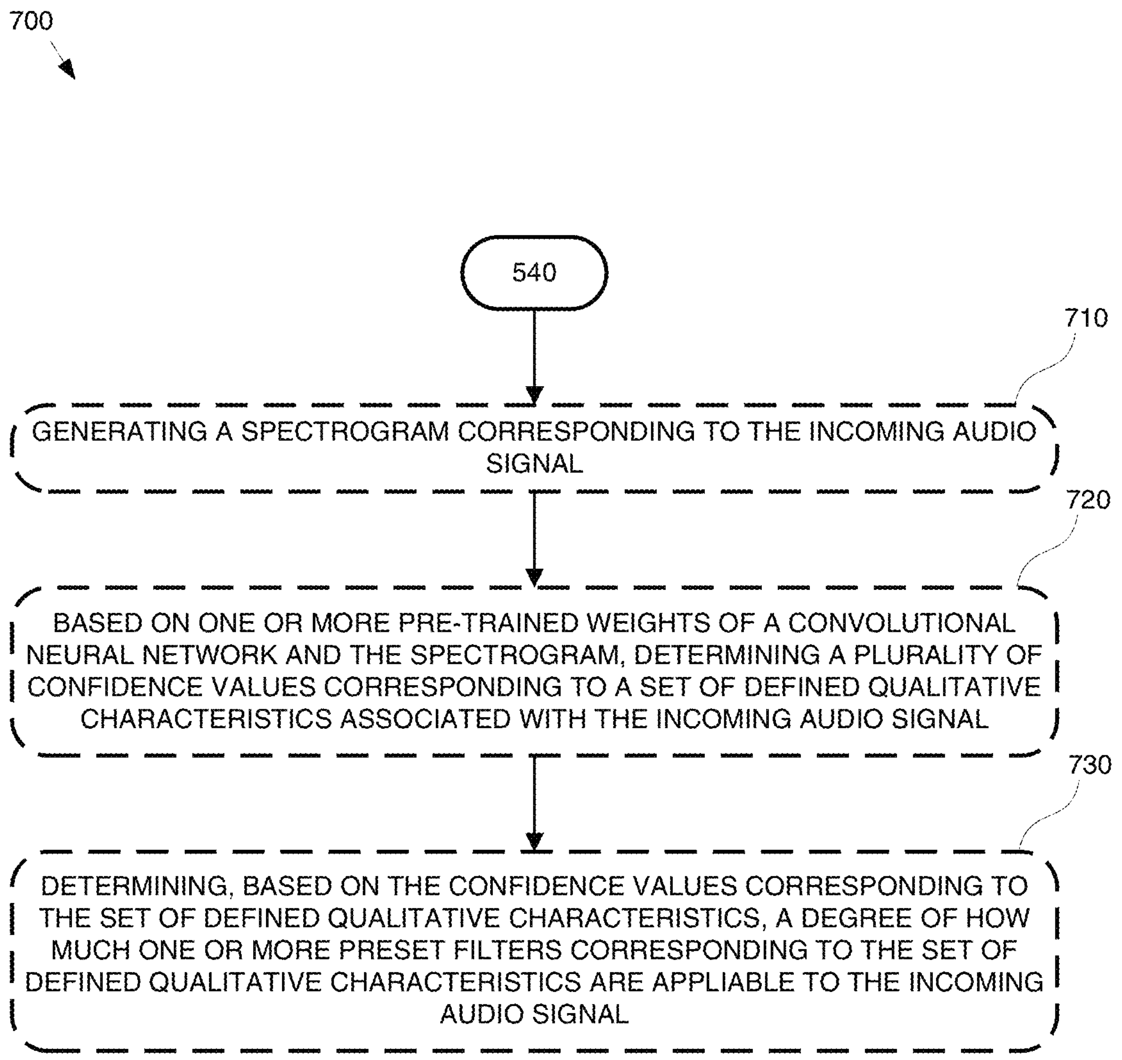
FIG. 7 is a flow chart showing an adaptive content-equalization method, according to one or more embodiments.

Referring to FIG. 7, an adaptive content-equalization method 700 of determining application of one or more preset filters by a pre-trained neural network is shown. In a step 710, the audio signal correction system generates a spectrogram corresponding to the incoming audio signal; this may occur at a high rate (>1 Hz) to provide high-resolution frequency spectrum data that can be utilized to detect acute changes in the frequency spectrum that may be linked to changes in qualitative characteristics in the audio signal that should be corrected for in real-time. For example, within the same musical track, a melody and/or beat may be interrupted by spoken word (e.g., vocalizations, rap lyrics). Thus, a standardized equalization for the entire musical track will not sufficiently account for these fine changes within the musical track. In addition, Mel scaling may be used to modify the resulting spectrogram and ease the analysis of human-distinguishable frequency ranges. In a step 720, the audio signal correction system determines, based on one or more pre-trained weights of a CNN and the spectrogram, a plurality of confidence values corresponding to a set of defined qualitative characteristics associated with the incoming audio signal. Within the same musical track, individual qualitative characteristics cannot on their own account for the entirety of the musical track—in fact, most music adopts characteristics that blend between one another. In a step 730, the audio signal correction system determines, based on the confidence values corresponding to the set of defined qualitative characteristics, a degree of how much one or more preset filters corresponding to the set of defined qualitative characteristics are appliable to the incoming audio signal. Especially in contemporary music, it is rare that a musical track is simply considered "rock" or "jazz"—rather, there is almost always a fusion of multiple characteristics at play that must be accounted for. As such, the partial application of a series of preset filters is a much more effective equalization method than simply accepting an overarching equalization filter based on how the musical track's genre is defined in metadata. It should be appreciated that these steps 710-730 may be computed in real-time in order to provide seamless equalization that dynamically adjusts to the content.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims. For example, the AC power consumption measurements may be achieved through different methods and using circuitry that deviates from the examples provided herein-more importantly the embodiments described are concerned more with how the measurements are utilized in producing dynamic corrective filtering of an incoming audio signal.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. In reference to the above power consumption correction method 400, the psychoacoustic correction method 500, and the adaptive content-equalization method 600, each may be applied alone or in unison. However, in a preferred embodiment, each method achieves maximum effectiveness when used in combination because they account for different variables that occur while listening to headphones, i.e., a device's power consumption and efficiency idiosyncrasies, a human user's perception of the sound, and the dynamic changes in the sound's qualitative characteristics.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A system comprising:

one or more processors;

one or more memory devices;

one or more sensors communicatively coupled to the one or more processors;

an audio amplifier communicatively coupled to the one or more processors;

an audio transducer communicatively coupled to the audio amplifier;

wherein the one or more memory devices comprise a series of instructions executable by the one or more processors, wherein executing the series of instructions causes the one or more processors to:

receive an incoming audio signal and amplify the incoming audio signal through the audio amplifier;

output the amplified audio signal through the audio transducer, wherein the amplified audio signal comprises one or more frequencies output;

for each of the one or more frequencies output by the audio transducer, measure a frequency-specific AC power consumption of the audio transducer; and based on the frequency-specific AC power consumption, calculate an impedance of the audio transducer and a projected volume level of the audio transducer.

2. The system of claim 1, wherein the instructions further comprise:

applying an inverse discrete Fourier transform to the frequency-specific AC power consumption to generate a finite impulse response filter appliable to the incoming audio signal to output a corrected amplified audio signal, wherein the finite impulse response filter equalizes the projected volume level output by the audio transducer.

3. The system of claim 1, wherein measuring the frequency-specific AC power consumption involves measuring an amplitude of a voltage of the incoming audio signal, an amplitude of a current of the incoming audio signal, and a phase shift between the voltage and the current.

4. The system of claim 1, wherein the series of instructions further comprises:

determine a corresponding equal-loudness curve based on the frequency-specific AC power consumption, the impedance of the audio transducer, and the projected volume level of the audio transducer;

invert the corresponding equal-loudness curve to produce a psychoacoustic corrective filter appliable to the incoming audio signal to output a corrected amplified audio signal, and wherein the psychoacoustic corrective filter equalizes a user-perceived loudness of the amplified signal output by the audio transducer.

5. The system of claim 1, wherein the series of instructions further comprises:

generating a spectrogram corresponding to the incoming audio signal;

based on one or more pre-trained weights of a convolutional neural network and the spectrogram, determine a plurality of confidence values corresponding to a set of defined qualitative characteristics associated with the incoming audio signal.

6. The system of claim 5, wherein the series of instructions further comprises:

determining, based on the confidence values corresponding to the set of defined qualitative characteristics, a degree of how much one or more preset filters corresponding to the set of defined qualitative characteristics are appliable to the incoming audio signal.

7. A device, comprising:

one or more processors;

one or more memory devices;

one or more sensors communicatively coupled to the one or more processors;

an audio amplifier communicatively coupled to the one or more processors and configured to output to an audio transducer;

wherein the one or more memory devices comprise a series of instructions executable by the one or more processors, wherein executing the series of instructions causes the one or more processors to:

receive an incoming audio signal and amplify the incoming audio signal through the audio amplifier;

output the amplified audio signal through the audio transducer, wherein the amplified audio signal comprises one or more frequencies output;

for each of the one or more frequencies output by the audio transducer, measure a frequency-specific AC power consumption of the audio transducer; and based on the frequency-specific AC power consumption, calculate an impedance of the audio transducer and a projected volume level of the audio transducer.

8. The device of claim 7, wherein the instructions further comprise:

applying an inverse discrete Fourier transform to the frequency-specific AC power consumption to generate a finite impulse response filter appliable to the incoming audio signal to output a corrected amplified audio signal, wherein the finite impulse response filter equalizes the projected volume level output by the audio transducer.

9. The device of claim 7, wherein measuring the frequency-specific AC power consumption involves measuring an amplitude of a voltage of the incoming audio signal, an amplitude of a current of the incoming audio signal, and a phase shift between the voltage and the current.

10. The device of claim 7, wherein the series of instructions further comprises:

determine a corresponding equal-loudness curve based on the frequency-specific AC power consumption, the impedance of the audio transducer, and the projected volume level of the audio transducer; and invert the corresponding equal-loudness curve to produce a psychoacoustic corrective filter appliable to the incoming audio signal to output a corrected amplified audio signal, and wherein the psychoacoustic corrective filter equalizes a user-perceived loudness of the amplified signal output by the audio transducer.

11. The device of claim 7, wherein the series of instructions further comprises:

generating a spectrogram corresponding to the incoming audio signal;

based on one or more pre-trained weights of a convolutional neural network and the spectrogram, determine a plurality of confidence values corresponding to a set of defined qualitative characteristics associated with the incoming audio signal.

12. The device of claim 7, wherein the series of instructions further comprises:

determining, based on the confidence values corresponding to the set of defined qualitative characteristics, a degree of how much one or more preset filters corresponding to the set of defined qualitative characteristics are appliable to the incoming audio signal.

13. A method of audio signal correction embodied in machine-readable instructions stored in one or more memory devices and executable by one or more processors, the instructions comprising:

receiving, through the one or more processors, an incoming audio signal and amplifying the incoming audio signal through an audio amplifier communicatively coupled to the one or more processors, outputting the amplified audio signal through an audio transducer coupled to the audio amplifier, wherein the amplified audio signal comprises one or more frequencies output;

measuring, through one or more sensor(s) communicatively coupled to the one or more processor(s), a frequency-specific AC power consumption of the audio transducer for each of the one or more frequencies output by the audio transducer; and calculating an impedance of the audio transducer and a projected volume level of the audio transducer based on the frequency-specific AC power consumption.

14. The method of claim 13, further comprising:

applying an inverse discrete Fourier transform to the frequency-specific AC power consumption to generate a finite impulse response filter appliable to the incoming audio signal to output a corrected amplified audio signal, wherein the finite impulse response filter equalizes the projected volume level output by the audio transducer.

15. The method of claim 13, wherein measuring the frequency-specific AC power consumption involves measuring an amplitude of a voltage of the incoming audio signal, an amplitude of a current of the incoming audio signal, and a phase shift between the voltage and the current.

16. The method of claim 13, further comprising:

determining a corresponding equal-loudness curve based on the frequency-specific AC power consumption, the impedance of the audio transducer and the projected volume level of the audio transducer; and inverting the corresponding equal-loudness curve to produce a psychoacoustic corrective filter appliable to the incoming audio signal to output a corrected amplified audio signal, and wherein the psychoacoustic corrective filter equalizes a user-perceived loudness of the amplified signal output by the audio transducer.

17. The method of claim 13, further comprising:

generating a spectrogram corresponding to the incoming audio signal;

based on one or more pre-trained weights of a convolutional neural network and the spectrogram, determining a plurality of confidence values corresponding to a set of defined qualitative characteristics associated with the incoming audio signal.

18. The method of claim 17, further comprising:

determining, based on the confidence values corresponding to the set of defined qualitative characteristics, a degree of how much one or more preset filters corresponding to the set of defined qualitative characteristics are appliable to the incoming audio signal.

* * * * *